United States Patent [19]

Fischer

[11] 4,020,687

[45] May 3, 1977

[54] ELECTRODYNAMIC FORCE MEASURING APPARATUS

[76] Inventor: Peter Fischer, Dolderstrasse 40, 8032 Zurich, Switzerland

[22] Filed: June 20, 1975

[21] Appl. No.: 589,487

[30] Foreign Application Priority Data

June 26, 1974 Switzerland .................. 8747/74

[52] U.S. Cl. .................. 73/141 R; 73/517 B
[51] Int. Cl.² .................. G01L 1/08
[58] Field of Search .................. 73/141 R, 517 B; 318/610, 616, 632, 646, 651, 676; 177/212

[56] References Cited

UNITED STATES PATENTS

| | | | |
|---|---|---|---|
| 2,685,200 | 8/1954 | Slottow et al. | 73/141 R |
| 2,940,747 | 6/1960 | Eder et al. | 73/141 R X |
| 2,995,935 | 8/1961 | Eyestone et al. | 73/517 B |
| 3,046,794 | 7/1962 | Fischel | 73/517 B |
| 3,680,393 | 8/1972 | Rogall | 73/517 B |

Primary Examiner—James J. Gill
Attorney, Agent, or Firm—Werner W. Kleeman

[57] ABSTRACT

An electrodynamic force measuring apparatus comprising a force coil arranged in a stationary magnetic field and movable out of a null position by means of the force which is to be measured. The force coil is supplied with a current through the agency of an amplifier as a function of its deviation out of the null position as detected by a feeler. This current, under the action of the stationary magnetic field, produces a restoring force which forces back the force coil into the null position. The force coil is connected in series with a compensation coil which varies the field intensity of the stationary magnetic field. The compensation coil is dimensioned to alter the magnetic field resulting from the stationary magnetic field and the magnetic field produced by the current in the force coil in such a manner that the restoring force acting upon the force coil remains proportional to the current.

2 Claims, 3 Drawing Figures

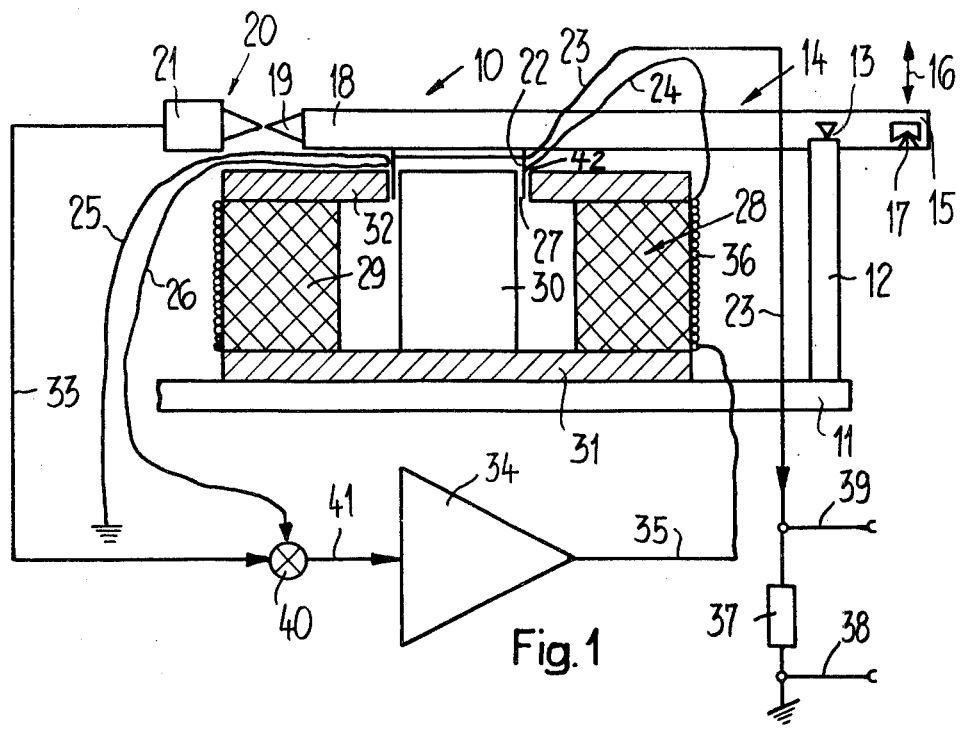
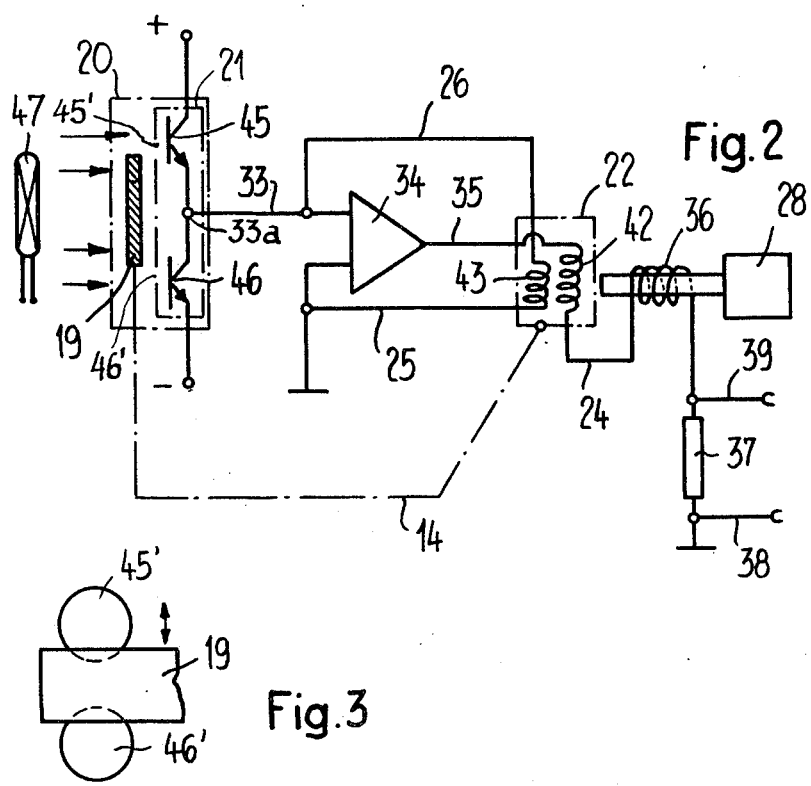

ELECTRODYNAMIC FORCE MEASURING APPARATUS

BACKGROUND OF THE INVENTION

The present invention relates to a new and improved construction of an electrodynamic force measuring apparatus comprising a force coil arranged in a stationary magnetic field and movable out of a null position by the action of the force which is to be measured, this force coil is supplied with a current through the agency of an amplifier as a function of its deviation out of the null position as detected by a feeler, this current producing, under the action of the stationary magnetic field, a restoring force which forces back the force coil into the null position.

With such a force measuring apparatus the current delivered to the force coil by the amplifier serves directly or indirectly, for instance in the form of a voltage which is tapped-off across a resistor, as a measure for the force which is to be measured. The relationship of the current intensity-force is then linear when the influencing of the stationary magnetic field by the secondary magnetic field produced by the current flowing through the force coil is practically negligible. However, this is only then the case with smaller forces, also with smaller currents. On the other hand, with larger forces the magnetic field generated by the current flowing in the force coil must be vectorially added to the stationary magnetic field, producing a resultant magnetic filed possessing a direction deviating from the stationary magnetic field. The restoring force acting upon the coil is however —apart from the current intensity of the current flowing through the coil — dependent upon the resultant magnetic field. Consequently, it will be appreciated that the change of the direction of the resultant magnetic field has the result that, with larger forces, there is no longer maintained the linear relationship between the current and the force which is to be measured.

SUMMARY OF THE INVENTION

Hence, it is a primary object of the present invention to provide a new and improved construction of an electrodynamic force measuring apparatus which is not associated with the aforementioned drawbacks and limitations of the prior art proposals.

Another and more specific object of the present invention aims at the provision of a new and improved construction of electrodynamic force measuring apparatus of the previously mentioned type which is improved in such a way that even in the case of larger forces there is automatically maintained the linear relationship between the force which is to be measured and the current supplied by the amplifier to the force coil.

Now in order to implement these and still further objects of the invention, which will become more readily apparent as the description proceeds, the force measuring apparatus of the present invention is manifested by the features that the force coil is connected in series with a compensation coil which changes or varies the field intensity of the stationary magnetic field, this compensation coil being dimensioned such as to be able to change the resultant magnetic field derived from the stationary magnetic field and the magnetic field generated by the current flowing in the coil in such a manner that the restoring force acting upon the force coil remains proportional to the current.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a schematic view, partially in section, of a force measuring apparatus designed according to the teachings of the present invention;

FIG. 2 is an extremely simplified circuit diagram of the apparatus depicted in FIG. 1, and FIG. 3 is a schematic front view of the essential components of a feeler which can be used with the apparatus portrayed in FIG. 2.

DETAILED DESCRIPTION OF THE INVENTION

Describing now the drawing, with the exemplary illustrated embodiment of apparatus 10 portrayed in FIG. 1 there will be recognized a stationary frame component 11 at which there is supported a column 12. At the upper end of the column 12 there is mounted through the agency of a knife-edge support or bearing 13 a beam or beam member 14 in the manner of a balance beam. At one end 15 of the beam 14 there engages through the agency of a further knife-edge support 17 a not further illustrated force transmission element which transmits to the beam 14 the force which is to be measured, as the same has been merely schematically indicated by the double-headed arrow 16. At the other end 18 of the beam 14 there is secured the movable component or member 19 of a feeler 20 which is intended to detect the presence and the direction of devications of the beam or beam member 14 out of the substantially horizontal null position appearing in FIG. 1.

Continuing, at the beam or beam member 14 there is secured at the region of its end 18 a coil or winding body or core 22 wound with two coil or windings which have not been particularly illustrated in FIG. 1 to preserve clarity in the showing of the drawing, but may be assumed to be similar to the windings or coils 42, 43 shown in FIG. 2. As far as these coils are concerned in the illustration of FIG. 1 there have only been portrayed on the one hand the connection conductors or lines 23, 24 and on the other hand the connection conductors or lines 25, 26. The coil body 22 together with its two coils or windings engages into a substantially ring-shaped or annular gap 27 of a powerful permanent magnet 28 which, in turn, is constituted by a permanent magnet ring or ring member 29, a soft iron core 30, a yoke disk 31 and a yoke ring or ring member 32. Hence, in principle the construction of the permanent magnet 28 corresponds to the construction of a magnet for an electrodynamic loud-speaker. In the annular or ring-shaped gap 27 there thus prevails a powerful magnetic field, the field lines of which parctically without exception extend in a plane disposed perpendicular to the axis of the soft iron core 30 and also extend radially from such axis. The permanent magnet 28 is stationary anchored by means of its components at the frame portion or component 11.

The stationary part or component 21 of the feeler 20 is operatively coupled via a connection line or conductor arrangement, such as the conductor or line 33 of FIG. 1, with an amplifier 34, the output 35 of which is connected with a coil or winding 36 which is wound about the permanent magnet ring 29. The other end of this coil 36 is connected via connection line or conductor 24 in series with the one coil at the coil core 22, whereas the other connection line or conductor 23 is connected with ground through the agency of a resistor 37. Across the resistor 37 there are connected the terminals 38 and 39 at which there can be tapped-off the voltage drop generated by a current flowing through the resistor 37.

The other coil provided at the core 22 is connected with ground by means of its connection conductor or line 25 and by means of its connection conductor or line 26 is connected via an addition element 40 electrically incorporated in the connection line 33 with the input 41 of the amplifier 34.

Prior to discussing in detail the mode of operation of the illustrated exemplary embodiment of apparatus of FIG. 1 reference will first still be made to the simplified circuit diagram of FIG. 2. By referring to such FIG. 2 there will be recognized the permanent magnet 28, in the field of which there is arranged the coil body or body member 22. The phantom lines which emanate from the coil body 22 symbolize the beam or beam member 14 at which there is also secured the movable portion or part 19 of the feeler 20. The coils arranged at the coil body 22 have been designated by reference characters 42 and 43 in FIG. 2, wherein it is to be appreciated that the difference with respect to the arrangement of FIG. 1 only resides in the fact that in FIG. 2 the sequence of the series connected coils which are powered by the amplifier 34 is designated by the coils 42-36, whereas in the arrangement of FIG. 1 the coil 36 is directly connected at the output of the amplifier 35. However, it is to be appreciated that this difference is of no consequence.

The stationary portion or part 21 of the feeler 20 possesses two series connected phototransistors 45 and 46, the inlet openings schematically illustrated by reference characters 45' and 46' in the shownig of FIG. 2, in the null position of the beam 14, are covered by the same amount by the movable portion or part 19 of the feeler 20, and which part 19 is constructed as a vane or lug or equivalent structure. The connection point or terminal 33a between both of the photo-transistors 45 and 46 is connected in circuit with the amplifier 34, as shown. Due to this arrangement there is insured that the current appearing at the output 35 of the amplifier 34 as to its direction and magnitude corresponds to the deviation of the vane 19 out of the equilibrium position, this also then being the case when the light source 47 illuminating the phototransistors 45 and 46 transmits a beam of light which varies in intensity.

The mode of operation of the illustrated apparatus can be summarized as follows: As soon as the beam 14 is deflected by a force, schematically illustrated by the double-headed arrow 16, out of its null position, then, the feeler or sensor 20 generates a signal which is delivered to the amplifier 34, causes this amplifier 34 to deliver a current to the force coil or winding 42 which, under the action of the stationary field emanating from the permanent magnet 28, produces a restoring force which strives to return or force the beam 14 back into the null position. This current will increase as long as a signal is generated by the feeler 20, This current generated by the amplifier 34 however flows with the same intensity through the compensation coil 36 and thus alters the intensity of the field emanating from the permanent magnet 28 in such a manner that there is maintained on the one hand the linearity between the current and the restoring force on the other hand (i.e. the force which is to be measured). As soon as the beam or beam member 14 has been deflected out of its null position, then a signal is also induced in the velocity induction coil 43. This signal, which is only present for such length of time as the beam 14 is in motion, is likewise delivered to the amplifier 34 in addition to the signal emanating from the feeler 20. This produces the result that initially and temporarily the amplifier 34 delivers a higher current than would be required for producing the restoring force. This arrangement contributes to the fact that the apparatus is able to very rapidly aperiodically find its equilibrium position. It should be readily apparent that in the equilibrium position there can be tapped-off at the terminals 38 and 39 a voltage which is directly proportional to the current flowing in the coils 36 and 42, this volatge constituting a measure for the force which is to be measured.

Finally, reference is here still made to the arrangement of FIG. 3 wherein reference characters 45' and 46' designate the inlet openings of the phototransistors 45 and 46 respectively, which, as already mentioned, are approximately covered by the same amount by means of the vane or lug 19 in the null position.

The described apparatus is not only suitable for use as a classical balance, that is to say, as an instrument for the determination of the weight of materials or the like, rather also can be used as an acceleration measuring device or as a force measuring cell which is suitable for measuring larger forces rapidly, accurately and, if necessary, at distances according to direction and magnitude.

While there is shown and described present preferred embodiments of the invention, it is to be distinctly understood that the invention is not limited thereto but may be otherwise variously embodied and practiced within the scope of the following claims: ACCORDINGLY,

What is claimed is:

1. An electrodynamic force measuring apparatus comprising a force coil arranged in a stationary magnetic field and movable out of a null position by the action of the force which is to be measured, a stationary substantially ring-shaped permanent magnet possessing a substantially ring-shaped gap in which there is axially displaceably arranged said force coil, the return path of the magnetic flux being coaxial to and within said ring-shaped permanent magnet, a feeler for detecting deviations of the force coil out of the null position, said feeler including a movable component, means for pivotably suspending the movable component for free pivotable movement, an amplifier for supplying the force coil with a current, said force coil as a function of its deviation out of the null position detected by the feeler being supplied via the amplifier with said current which under the action of the stationary magnetic field produces a restoring force which forces the force coil back into the null position, said force coil being connected in series with a compensation coil changing the field intensity of the stationary magnetic field, said compensation coil being wound coaxially with respect to the force coil, said compensation coil being dimensioned such as to vary a resultant magnetic filed composed of the stationary magnetic field and a magnetic field generated by the flow of current in said force coil in such a manner that the restoring force acting upon the force coil remains substantially proportional to the current, a velocity coil member movable together with the force coil in the same magnetic field as the force coil, said amplifier having an input, said velocity coil member being connected in circuit with the input of said amplifier.

2. The force measuring apparatus as defined in claim 1, wherein said velocity coil member is arranged coaxially with respect to the force coil.

* * * * *